United States Patent [19]

Clark, Jr.

[11] Patent Number: 4,617,801
[45] Date of Patent: Oct. 21, 1986

[54] THERMALLY POWERED ENGINE

[76] Inventor: Robert W. Clark, Jr., 2232 W. Joan de Arc Ave., Phoenix, Ariz. 85029

[21] Appl. No.: 803,549

[22] Filed: Dec. 2, 1985

[51] Int. Cl.$^4$ .............................................. F25B 1/00
[52] U.S. Cl. ........................................ 62/116; 62/467; 60/593; 91/394; 91/398
[58] Field of Search ................. 62/116, 333, 335, 467; 60/593, 581; 92/64, 97; 91/394, 398

[56] References Cited

U.S. PATENT DOCUMENTS

| | | | |
|---|---|---|---|
| 4,009,587 | 3/1977 | Robinson, Jr. et al. | 62/116 |
| 4,120,172 | 10/1978 | Pierce | 62/467 R X |
| 4,418,547 | 12/1983 | Clark, Jr. | 62/116 |
| 4,450,690 | 5/1984 | Clark, Jr. | 62/116 |
| 4,537,036 | 8/1985 | Clark, III | 62/116 |
| 4,537,037 | 8/1985 | Clark, Jr. | 62/116 |

Primary Examiner—William E. Tapolcai
Attorney, Agent, or Firm—Edward W. Hughes

[57] ABSTRACT

A thermally powered engine which obtains energy from a closed heat transfer loop. The engine has two power cylinders. A piston is reciprocally mounted within each cylinder and divides the interior space of each cylinder into two portions. A piston rod is affixed to each piston and extends through the upper closed end of each cylinder. A flexible diaphragm is mounted in the lower portion of each cylinder and with the lower closed end of the cylinder forms a power chamber. A fluid fills the upper portion of both cylinders. A passageway between the cylinders permits the fluid to act as a free piston causing the piston of the cylinder in its exhaust stroke to force refrigerant from its power chamber to the condenser of the heat transfer loop. Refrigerant from the evaporator of the transfer loop flowing into a power chamber forces the piston upward during the pistons power stroke. Valves regulate the flow of refrigerant into and out of the power chambers of each of the power cylinders. Flow of refrigerant is controlled so that motion of the pistons of the two power cylinders is 180° out of phase. Several pairs of power cylinders can be connected in series with the refrigerant flowing through the pairs serially prior to reaching the condenser. Isothermal sequential displacement of the refrigerant through the power chambers of a series of pairs of power cylinders increases the thermal efficiency of the engine.

20 Claims, 4 Drawing Figures

Fig-1

THERMALLY POWERED ENGINE

BACKGROUND OF THE INVENTION

1. Field of the Invention

This invention is in the field of thermally powered engines. This invention relates more specifically to thermally powered engines capable of utilizing relatively small temperature differences at relatively low temperatures to convert thermal energy into useful work. This invention relates more specifically to thermally powered heat transfer systems capable of effecting useful heating, useful cooling and useful mechanical work simultaneously. To accomplish these multiple purposes this invention incorporates a new and unique thermally powered engine to compress air. This new and unique engine may, in other circumstances, be operated to pump liquids. As incorporated in this invention this thermally powered engine can compress air. The heat of compression of the compressed air is a source of heat, the mechanical work potential of the compressed air is utilized to accomplish useful mechanical work, in this case to drive an electric power generator, and the cooling effect of the expanding air is used to operate a freezer and refrigerator.

This invention is specifically a significant improvement upon U.S. Pat. No. 4,418,547, THERMALLY POWERED HEAT TRANSFER SYSTEMS, issued to the inventor of this invention on Dec. 6, 1983. This significant improvement results from a new method for employing a liquid piston as described and claimed in U.S. Pat. No. 4,418,547. This new method, in combination with multiple pistons, separates total force exerted by a working fluid into two components: (1) the force necessary to return two pistons to their original position; and (2) the remaining net force which can be exerted by the working surface of one of the other pistons to accomplish useful work, such action taking place alternately. This separation of forces allows variation in displacement volumes, and this variation in displacement volumes is a significant improvement over U.S. Pat. No. 4,418,547. This improvement in turn extends the capabilities of this invention beyond those of the Thermally Powered Heat Transfer Systems of U.S. Pat. No. 4,418,547 and permits this invention to make useful all phases of the compression cycle sequentially.

This invention also incorporates a new method of sequential displacement, isothermal (and/or adiabatic) sequential displacement, this new method providing greater thermal efficiency at lower cost than the method of sequential displacement described in U.S. Pat. No. 4,537,037 entitled THERMALLY POWERED HEAT TRANSFER SYSTEMS UTILIZING SEQUENTIAL DISPLACEMENT, of which the inventor of this invention is the inventor, Isothermal sequential displacement can be used in conjunction with the earlier method. But this invention, utilizing isothermal sequential displacement, is capable of utilizing effectively the entire range of any given temperature difference, large as well as small, and thus can stand alone to achieve its multiple purposes.

2. Description of the Prior Art

The thermally powered heat transfer systems described in U.S. Pat. No. 4,418,547 issued Dec. 6, 1983 employs a two chambered compressor which acts with positive compressive action in both of the two possible compressive action directions; employs two heat sources to effect these compressive actions, one of these heat sources being located within the structure to be cooled when the system is used for cooling, employs two closed loops containing two different refrigerants, and employ two condensers both of which reject heat to an external heat sink when the system is used for cooling, the external heat sink having a temperature below that of the high temperature heat source and above that of the low temperature heat source. The thermally powered heat transfer system described in U.S. Pat. No. 4,418,547 permits the higher temperature heat source to have a relatively low temperature in comparison to the temperature required for the operation of other thermally powered refrigeration systems to accomplish the cooling of a structure.

The thermally powered heat transfer systems described in U.S. Pat. No. 4,530,037, employ sequential displacement and a larger temperature difference to improve the thermal efficiency of the thermally powered heat transfer systems described in U.S. Pat. No. 4,418,547. Sequential displacement is the general method whereby the same heat at sequentially lower temperatures can be used repetitively to accomplish the efficient heating or cooling of a structure or multiple structures.

SUMMARY OF THE INVENTION

The present invention provides, for example, the means of satisfying a number of the energy requirements of a home. The present invention employs new and unique thermally powered engines which may be employed as a single pair of multiple pairs of power cylinders. The thermally powered engine is made new and unique by virtue of a new general method for employing a free, liquid piston common to both power and powered cylinders in combination with four rigid pistons, one in each cylinder, in a manner which permits the total force exerted by a working fluid within one of the two power cylinders to be separated into two components: (1) the force necessary to effect the return of two pistons of the engine to their starting position; and (2) the remaining net effective force which can be and is exerted by the working surface of the other piston pair of the engine to accomplish useful work; such actions taking place alternately.

A system incorporating the present invention may utilize only a single heat source which supplies heat to a working fluid contained within a single closed heat transfer loop. The present invention designed in this manner compresses air accepted at atmospheric conditions, transfers the heat of compression to water to provide heated water, utilizes the mechanical energy of the compressed air to drive an air motor which turns an electric generator, and utilizes the cooling effect of the expanding compressed air for food refrigeration. In this mode of operation the present invention does not employ a closed heat transfer loop on the powered side of the system. The present invention employed in this manner uses all phases of the compression cycle for useful heating, work, and cooling. The present invention designed in this manner may also be employed as a pump for the pumping of liquids or the compression of gases.

The present invention may also be designed as a heat pump system in which case the power side of the system consists of a heat source supplying thermal energy to a working fluid contained within a closed heat transfer loop as described above and the powered side of the system consists of one or more closed heat transfer loops containing one or more refrigerants with each closed heat transfer loop having an evaporator and a condenser, the functions of which are reversed during different modes of operation. The powered side of such systems thus also has a heat source.

Depending upon the size of the temperature differences and other factors the present invention may also employ isothermal or adiabatic sequential displacement to improve thermal efficiency. When isothermal or adiabatic sequential displacement is employed, the present invention incorporates two or more thermally powered pairs of power cylinders united by a single closed heat transfer loop for the power side which is supplied with heat by a single heat source. Such systems require only a single evaporator and a single condenser for the closed heat transfer loop of the power side of the system.

The temperature differences which power this invention, however designed and employed, may be relatively small and the actual magnitudes of these temperatures are not significant. In large part this is due to the fact that the relative size in terms of area of the working surfaces of the thermally powered dual reciprocating compressors may be varied as required to utilize small temperature differences in any given temperature range to accomplish the useful purposes described.

It is therefore an object of this invention to provide a thermally powered system useful for the heating of water for a home or for other heating purposes, such purposes being accomplished in addition to useful mechanical work and useful cooling.

It is still another object of this invention to provide a thermally powered system useful for the generation of electric power or for the performance of other useful mechanical work.

It is still another object of this invention to provide a thermally powered system useful for the refrigeration of food or for other refrigeration purposes, such purposes being accomplished in addition to useful heating and useful mechanical work.

It is still another object of this invention to provide a thermally powered system useful as a heat pump for the heating and cooling of a home or other structure.

It is still another object of this invention to provide a thermally powered system useful as a pump for the pumping of liquids.

It is still another object of this invention to provide a thermally powered system useful as a compressor for the compression of gases.

It is still another object of this invention to provide a thermally powered system useful for multiple purposes which may be powered by relatively small as well as large temperature differences.

It is still another object of this invention to provide a thermally powered system useful for multiple purposes which may be powered by relatively small temperature differences regardless of the actual temperatures involved.

It is still another object of this invention to provide a new and unique general method for the employment of free liquid pistons, which, in combination with four rigid pistons, one within each cylinder of a pair of cylinders of an engine, permits the separation of the total force exerted by a working fluid into two compoments: (1) the force necessary to effect the return stroke of two pistons; and (2) the remaining net effective force which is exerted by the working surface of one or the other of the power pistons to accomplish useful work.

It is still another object of this invention to provide a new and unique general method for improving the thermal efficiency of thermally powered engines employing positive displacement, this new and unique general method being isothermal or adiabatic sequential displacement.

It is still another object of this invention to provide a thermally powered system which can be powered by naturally occurring temperature differences, by solar energy, or by any fuel including biomass.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
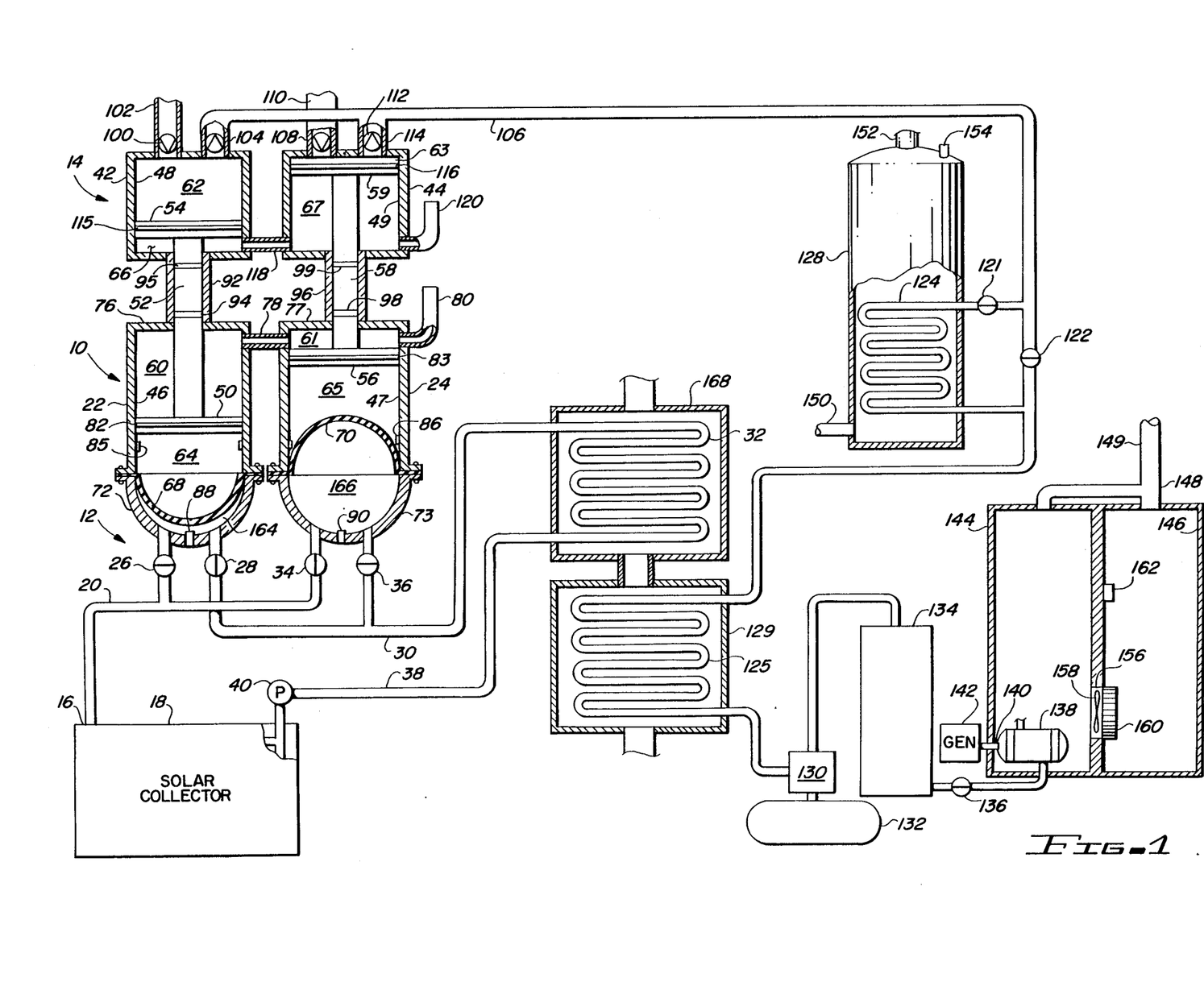
FIG. 1 is a schematic view of a preferred embodiment of the thermally powered engine employed to provide the useful heating of water, the useful generation of electric power and useful refrigeration.

Multi-purpose heat transfer system, or engine, 10 depicted in FIG. 1 consists of a power side 12 and a powered side 14. The power side 12 includes a heat source herein depicted as a solar collector 16 containing a working fluid 18. The top of collector 16 is connected by means of vapor pipe 20 to power cylinders 22, 24. Vapor flow is regulated by solenoid valves 26 and 34 so that vapor flows into the lower portions of cylinders 22, 24 alternately, vapor pipe 30 carries vapor from cylinders 22, 24 to condenser 32. This vapor flow is regulated by solenoid valves 28, 36 so that vapor flows from each power cylinder alternately. Liquid pipe 38 carries condensed liquid to pump 40 which pumps the liquified working fluid 18 back into solar collector 16. These elements of power side 12 form a closed heat transfer loop which is filled with working fluid 18 in liquid and vapor forms. Condenser 32 is herein depicted as a heat transfer coil contained within the evaporator of a second heat transfer system so that the heat rejected by engine 10 can be reused utilizing sequential displacement as described in U.S. Pat. No. 4,537,037.

Each of the power cylinders 22, 24 has associated with it a powered cylinder 42, 44. Each of the cylinders 22, 24, 42, 44 defines a closed interior space 46, 47, 48, 49. Power cylinder 22 has a rigid piston 50 connected by means of piston rod 52 to rigid piston 54 of powered cylinder 42. Power cylinder 24 has a piston 56 connected by means of a piston rod 58 to rigid piston 59 in powered cylinder 44.

Pistons 50, 56, 54, and 59 divide the interior spaces 46, 47, 48, 49 of cylinders 22, 24, 42, 44 into two portions, upper portions 60, 61, 62, 63 and lower portions 64, 65, 66, and 67. Each power cylinder 22, 24 has an impervious flexible diaphragm 68, 70 which are made to conform to the hemispheric inner surfaces of the lower ends 72, 73. The volume of lower portion 64 between flexible diaphragm 68 and rigid piston 50 is filled with a fluid such as a liquid which has a low coefficient of expansion and this liquid serves as a liquid piston between the two. The volume of lower portion 65 between flexible diaphragm 70 and rigid piston 56 is filled with an equal volume of the same liquid. The volume between rigid piston 50 and the upper end 76 of cylinder 22, the volume between rigid piston 56 and the upper end 77 of cylinder 24, and connecting pipe 78 which connects the upper portions 60, 61 of cylinders 22, 24 are filled with the same liquid. Because of connecting pipe 78, this liquid serves as a liquid piston between the upper surfaces of pistons 50 and piston 56. Pressurized liquid volume regulator, or accumulator, 80 is connected to portion 61 of cylinder 24 and provides compensation for thermal expansion or contraction of the liquid filling the upper portions 60, 61. Seals 82, 83 prevent the flow of liquid around rigid pistons 50 and 56. Retaining rings 85 and 86 limit the downward movement of rigid pistons 50 and 56 respectively and are useful when initializing power cylinders 22, 24. Switch 88 is located at the bottom of lower portion 64 and is activated by flexible diaphragm 68 when flexible diaphragm 68 is deflated. When activated switch 88 opens solenoid valves 26 and 36 and closes solenoid valves 28 and 34. Switch 90 is located at the bottom of lower chamber 65 and is activated by flexible diaphragm 70 when flexible diaphragm 70 is deflated. When activated switch 90 closes solenoid valves 26 and 36 and opens solenoid valves 28 and 34. Structural support 92 connects lower cylinder 22 to upper cylinder 42 and serves as a guide and support for piston rod 52. Seals 94 and 95 prevent the flow of fluid from cylinder 22 to 42. Structural support 96 connects lower cylinder 24 to upper cylinder 44 and serves as a guide and support for piston rod 58. Seals 98 and 99 prevent the flow of fluid from cylinder 24 to 42.

One way valve 100 permits air at atmospheric pressure to flow through pipe 102 into upper portion 62 of cylinder 42 when rigid piston 54 moves downward. One way valve 104 permits compressed air to flow out of upper chamber 62 through pipe 106. One way valve 108 permits ambient air to flow into upper portion 63 of cylinder 44 through pipe 110 when rigid piston 59 moves downward. One way valve 112 permits compressed air to flow out of upper portion 63 of cylinder 44 through pipe 114 into pipe 106 when rigid piston 59 moves upward. Seals 115 and 116 prevent the flow of fluid (gas or liquid) around rigid pistons 54 and 59 respectively. Space 66 between piston 54 and the lower end of cylinder 42, space 67 between piston 59 and the lower end of cylinder 44, and pipe 118 which connects them are filled with a fluid (gas or liquid under different conditions) under appropriate pressure. In the embodiment illustrated in FIG. 1 the space is filled with air at ambient pressure with pressure indicator accumulator 120 being a visual indicator of this pressure. The function of this fluid piston is to exert equal pressure upon the bottom surfaces of rigid pistons 54 and 59 under all operating conditions and to minimize leakage of the gas or fluid being compressed or pumped. One function of indicator 120 is to provide visual evidence of a failure of seals 115, 116. Rigid pistons 54 and 59 are equal in size. Rigid pistons 50 and 56 are also equal in size. Rigid pistons 50 and 56 may be smaller, larger or equal in size to rigid pistons 54 and 59.

The powered side 14 of engine 10 includes compressed air pipe 106, solenoid valves 121 and 122, heat transfer coils 124, 125, which are contained within tanks 128, 129, tank 129 constituting a refrigerant preheater, water trap 130, condensed water storage tank 132, air drier 134, pressure regulator valve 136, air motor 138, air motor shaft 140, electric generator 142 which is used to produce electrical power, freezer 144, refrigerator 146 and air exhaust pipes 148 and 149, freezer 144 and refrigerator 146 utilizing the cooling effect of the compressed air which expands as it flows through motor 138. Water tank 128 has a cold water inlet 150 a hot water exit 152, and a thermostat 154 which controls solenoid valves 121 and 122. Air vent 156 between freezer 144 and refrigerator 146 permits fan 158 to blow cold air through louvers 160 from freezer 144 to the refrigerator 146 when thermostat 162 activates fan 158.

To illustrate the operation of this invention let us assume that cylinders 22, 24 are as shown in FIG. 1 just prior to the complete deflation of flexible diaphragm 68, that the working fluid 18 is refrigerant R13B1, Bromotrifluoromethane, that the evaporating temperature within solar collector evaporator 16 is 70° F., at which temperature the vapor pressure of R13B1 is 213.7 PSIA, and that the condensing temperature within condensing coil 32 is 40° F., at which temperature the vapor pressure of R13B1 is 138.6 PSIA. When flexible diaphragm 68 completely deflates it activates switch 88 and switch 88 causes solenoid valves 28 and 34 to close and solenoid valves 26 and 36 to open. This permits R13B1 vapor to flow from the evaporator 16 through vapor pipe 20 into power chamber 164 of power cylinder 22 to inflate flexible diaphragm 68 and at the same time also permits vaporized working fluid 18 to flow from power chamber 166 of power cylinder 24 through vapor pipe 30 to condenser coil 32. Power chamber 164 is defined as the volume or space between diaphragm 68 and lower hemispheric end 72 of cylinders 22. Similarly, power chamber 166 is the space between diaphragm 70 and end 73 of power cylinder 24.

As vaporized working fliud 18 at a pressure of 213.7 PSIA inflates flexible diaphragm 68, essentially this same pressure is exerted upon the liquid between diaphragm 68 and piston 50 which in turn exerts this pressure on the bottom surface of rigid piston 50 causing rigid piston 50 to move upward. Ignoring for the sake of simplicity frictional losses caused by all seals and assuming for the moment no resistance to motion from rigid piston 54 of powered cylinder 42, this pressure of 213.7 PSI is exerted by rigid piston 50 on the liquid occupying upper portions 60, 61 of cyliinders 22, 24 and connecting passage 78 and thus upon the upper surface of rigid piston 56 of cylinder 24, and hence upon the liquid between piston 56 and diaphragm 70. Flexible diaphragm 70 deflates and forces vaporized working fluid 18 out of power chamber 166 of cylinder 24 through vapor pipe 30 into condensing coil 32 where it condenses at a pressure of 138.6 PSIA at the cited temperature of 40° F. Because of the essential incompressibility of liquids, it is evident that these movements will occur simultaneously whenever the force exerted upon the lower surface of rigid piston 50 plus the force exerted upon the upper surface of rigid piston 59 is greater than the force exerted upon the lower surface of rigid piston 56 plus the force exerted upon the upper surface of rigid piston 54. The forces exerted upon the lower surfaces of rigid pistons 54 and 59 are essentialy equal and thus are ignored.

The force exerted upon the bottom surface of rigid piston 50 when valve 26 is open and valve 28 closed is equal to the evaporating vapor pressure of vaporized working fluid 18 (213.7 PSI) times the area of rigid piston 50. The force exerted upon the upper surface of rigid piston 59 is atmospheric pressure (14.7 PSI) times the area of rigid piston 59. The force exerted upon the bottom surface of rigid piston 56 is equal to the condensing vapor pressure of vapor 18 (138.6 PSI) times the area of rigid piston 56. Thus, assuming all pistons have an area of 144 square inches, these movements described above will continue so long as the force exerted upon the upper surface of rigid piston 54 does not equal or exceed $(213.7 \times 144) + (14.7 \times 144) - (138.6 \times 144)$ or 12,931.2 pounds. Since the area of rigid piston 60 is 144 square inches, these movements will occur so long as the compressed air pressure within upper portion 62 of powered cylinder 42 does not equal or exceed 89.8 PSIA, or 75.1 PSIG. In other words, given equal piston areas and ignoring frictional and other losses, these movements will occur as described so long as the gauge pressure of the compressed air in upper portion 62 does not equal or exceed the pressure difference between the evaporating vapor pressure of vaporized working fluid 18 and the condensing vapor pressure of working fluid 18, 75.1 PSI or (213.7−138.6). This difference in pressure times the area of rigid piston 50 is the net force by which the total force exerted upon the bottom of rigid piston 50 exceeds the force exerted upon the bottom of rigid piston 56. Thus, this unique arrangement of power cylinders 22, 24 and powered cylinders 42, 44 permits net force to be applied to the working surface area of the positively acting piston 54 for example while effecting the return of the joined pistons 56 and 59 to their initial positions.

The size of pistons 54 and 59 is variable by design. For any given force, as the area increases there is a corresponding and proportional decrease in the maximum allowable pressure of the compressed air and as the area decreases there is a corresponding and proportional increase in the maximum allowable pressure of the compressed air. For example, as cited above if the area of all pistons is the same (144 square inches), the maximum allowable pressure is slightly less than 75.1 PSI. If, however, rigid pistons 54 and 59 are twice the size (288 square inches) of rigid pistons 50 and 56, the maximum allowable pressure is slightly less than half the former pressure, or slightly less than 37.55 PSI. If, however, pistons 54 and 59 are half the size (72 square inches) of rigid pistons 50 and 56, the maximum allowable pressure is slightly less than twice the former pressure, or slightly less than 150.2 PSI.

It is obvious from the above that engines practicing this invention can be designed to produce any given compressed air pressure within the limits of the materials of construction from any given pressure difference that exists between an evaporator and a condenser either by varying the design or by varying the working fluid so as to increase or decrease the pressure difference for any given temperature difference. But as the temperature of the heat source changes, the necessary temperature difference to produce a given pressure difference for which an engine may be designed may decrease or increase from the 30° F. temperature difference cited above. For example, if the temperature within evaporator 16 is increased to 140° F. from 70° F., at which temperature R13B1 has a vapor pressure of 501.8 PSIA, a condensing temperature of 125° F., at which temperature R13B1 has a vapor pressure of 424.1 PSIA, would result in a pressure difference of 77.7 PSI. Thus a 15° F. temperature difference at the higher temperatures would produce a greater pressure difference than the 30° F. temperature difference at the lower temperatures. Considering not only the actual temperatures of these examples but also the small temperature differences involved, this invention quite obviously can produce work utilizing temperatures and temperature differences not now considered useful for compressing of air and other gasses, for example.

As diaphragm 68 inflates and causes pistons 50 and 54 to move upward, air in upper portion 62 is compressed and forced out of cylinder 42 through one way valve 104 into compressed air pipe 106. While this is taking place, the downward movement of rigid pistons 56 and 59 permits air at atmospheric pressure to enter upper portion 63 of cylinder 44 through pipe 110 and one way valve 108. When diaphragm 68 is fully inflated diaphragm 70 is fully deflated and activates switch 90 which causes solenoid valves 28 and 34 to open and solenoid valves 26 and 36 to close.

This change in valve positions permits vaporized working fluid 18 to flow from evaporator 16 into power chamber 166 of cylinder 24 and also permits vaporized working fluid 18 to flow from power chamber 164 of cylinder 22 through vapor pipe 30 into condenser 32. As vaporized working fluid 18 flows into power chamber 166 flexible diaphragm 70 inflates causing liquid between diaphragm 70 and piston 56 to force the upward movement of rigid pistons 56 and 59 and also causing liquid occupying upper portions 60, 61 to force the downward movement of rigid pistons 50 and 54. Rigid piston 50 in turn forces the liquid between piston 50 and diaphragm 68 to cause the deflation of flexible diaphragm 68. As this is occurring piston 59 forces compressed air out of upper portion 63 through one way valve 114 into compressed air pipe 106. At the same time the downward movement of rigid pistons 50 and 54 permits air at atmospheric pressure to enter upper portion 62 through pipe 102 and one way valve 100. When flexible diaphragm 70 is fully inflated flexible diaphragm 68 is fully deflated and flexible diaphragm 68 activates switch 88 which causes solenoid valves 28 and 34 to close and causes solenoid valves 26 and 36 to open. One cycle, which involves one compressive stroke by piston 54 and one compressive stroke by piston 59, is now complete.

During operation of engine 10 vaporized working fluid 18 flows from one or the other of power chambers 164, 166 through vapor pipe 30 into condenser 32 where vaporized working fluid 18 condenses through the transfer of heat to the working fluid of some other closed loop heat transfer system for example contained within evaporator 168. Such multiple use of heat is termed sequential displacement in U.S. Pat. No. 4,537,037. The condensed liquified working fluid 18 then flows through liquid pipe 38 to pump 40 which pumps liquid 18 into evaporator 16.

Since one of the objects of this invention is the heating of water with the compressed air being the carrier of that heat, powered cylinders 42, 44 valves 100, 104, 108 and 112, pipes 102, 110, 112, and 106 are designed and insulated to prevent heat loss so as to permit such compression to take place in an essentially adiabatic manner. *Kent's Mechanical Engineers Handbook,* 1946 edition, states that if air at normal atmospheric pressure and at a temperature of 60° F. is compressed adiabatically to a pressure of 24.4 PSIA the resulting increase in the temperature of that air will be 115.8° F. If such air is compressed to a pressure of 44.1 PSIA, its temperature will increase 195.1° F.; if compressed to a pressure of 58.8 PSIA its temperature will increase by 257.4° F., and if compressed to a pressure of 73.5 PSIA its temperature will increase by 309.4° F. Given these data and the cited variable design capabilities of this invention, there is no double that this invention can perform the function of heating water for personal use.

The compressed air delivered to compressed air pipe 106 by powered cylinders 42, 44 has been heated by that compression and flows through pipe 106 and through open solenoid valve 121 into heat exchange coil 124 which is immersed in water contained within water tank 128 where heat from the compressed air is transferred to water. When the water within water tank 128 is heated to the desired temperature, thermostat 154 closes solenoid valve 121 and opens solenoid valve 122 which causes the heated air to bypass heat exchange coil 124 to prevent overheating of the water. When the temperature of the water drops below a given temperature, thermostat 154 closes solenoid valve 122 and opens solenoid valve 121 to again permit the flow of hot compressed air through heat exchange coil 124. Once the air has passed through heat exchange coil 124 or has by-passed heat exchange coil 124 by flowing through solenoid valve 122, it flows to heat exchange coil 125 where residual heat is transferred to the working fluid within preheater tank 129. Other uses of this residual heat could be made with alternate means of effecting heat transfer without departing from the spirit of the scope of this invention. Upon leaving heat exchange coil 125 the cooled compressed air then flows through water trap 130 where condensed moisture is removed from the air stream. The moisture so removed is permitted to flow into condensed water tank 132 which is periodically emptied. The cooled compressed air then flows into air drier 134 which removes remaining water vapor from the air stream. The cooled and dried compressed air then flows through pressure regulator valve 136 which blocks air flow when pressure drops below the desired minimum pressure but permits air flow otherwise into air motor 138 which is located within freezer 144. Compressed air motor 138, using the mechanical energy of the compressed air, turns a shaft 140 which extends through the wall of freezer 144 and which drives generator 142, to produce electric power. Generator 142 is located outside the freezer 144. The adiabatic expansion of the compressed air through air motor 138 provides the cooling for freezer 144. Refrigerator 146 is located next to freezer 144, being connected by air duct 156. When cooling is required by refrigerator 146, thermostat 162 turns on fan 158 which blows cold air from freezer 144 into refrigerator 146 through louvers 160. Exhaust air from refrigerator 144 flows through vent pipe 148 into exhaust air vent pipe 149 which carries exhaust air from freezer 144 into the kitchen during the summer or into the atmosphere otherwise.

If one pound of air at 60° F. and atmospheric pressure is compressed adiabatically to 58.8 PSIA its temperature would be increased to approximately 317° F. If this hot compressed air is then cooled by the transfer of heat to say 75° F., the heat transferred would be approximately 57.5 BTUs given the specific heat of air as 0.2375 BTUs per pound per °F. If pressure is maintained and if this compressed air at 75° F. is allowed to expand adiabatically, the temperature of the air would be approximately $-167°$ F. Thus, in terms of temperature there is no doubt that this invention could perform the desired cooling function in addition to the above cited heating function. Nor can there be doubt that the mechanical energy of compressed air can turn an air motor which could power an electric generator.

It should be pointed out that if a home's requirements for space heating and cooling, for water heating and for food refrigeration are satisfied by means other than the use of electric power, the remaining need for electric power is relatively small. It should also be pointed out that where naturally occurring temperature differences or solar energy can be utilized in third world nations, the present invention could help satisfy needs for hot water, for food refrigeration and for electric power.

It should also be pointed out that the present invention, without any modification of the dual cylinders, can be employed to pump liquids. Inlet pipes 102 and 110 would of course have to be extended to a source of water or other liquid, and outlet pipe 106 would have to deliver the water or other liquid to its intended destination. But no other changes would be required to convert the engine 10 as depicted in FIG. 1 into a thermally powered liquid pump. Design criteria and the manner of operation would also not change. Thus, wherever naturally occurring temperature differences or solar energy exists, the present invention could be employed as a water or other liquid distribution pump that would not require the use of expensive fossil fuels or of even more expensive or possibly non-existent electric power.

Figures 2, 4:
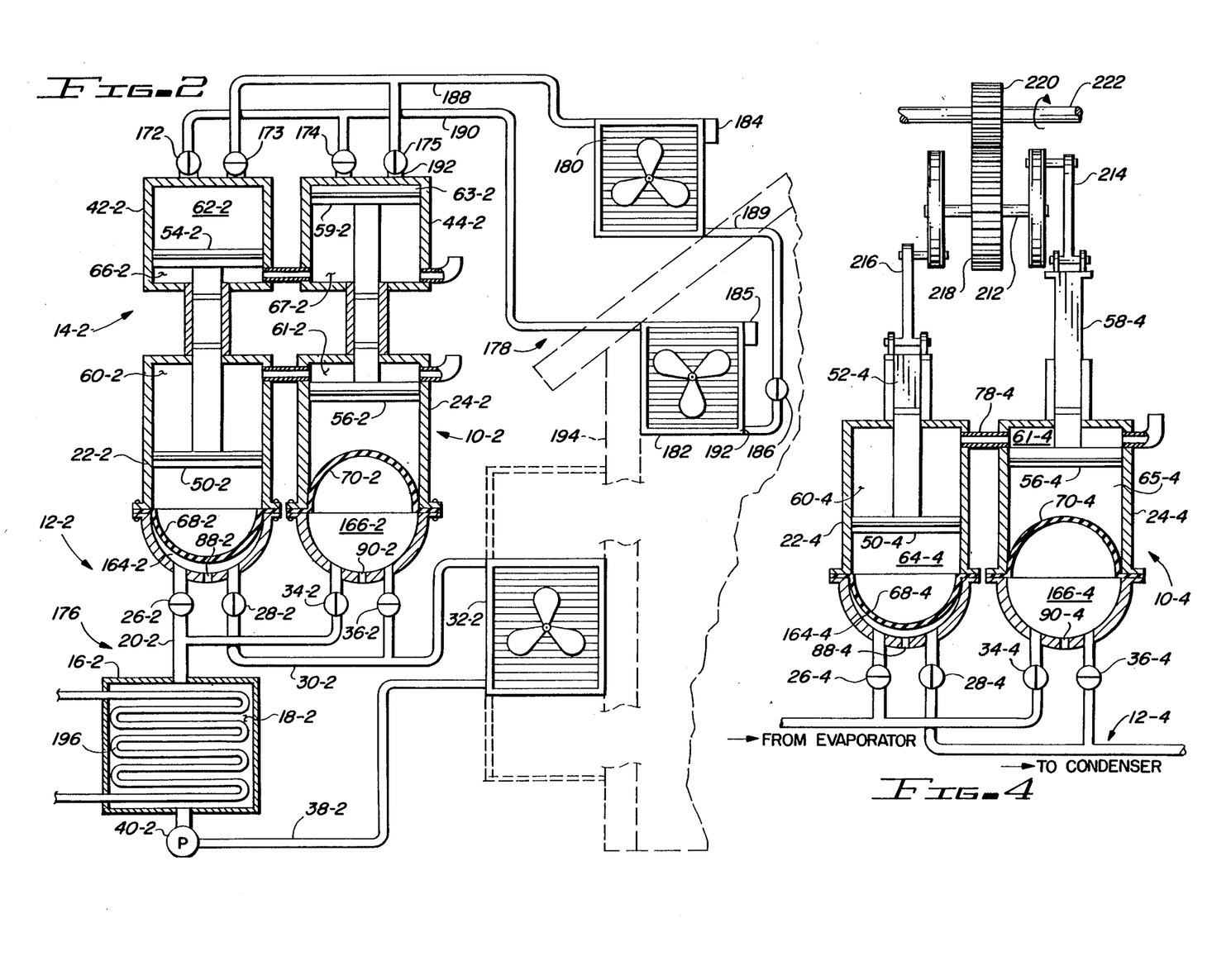
FIG. 2 is a schematic view of another embodiment of this invention illustrating its use as a thermally powered heat pump.
FIG. 4 is a schematic view of the thermally powered engine of this invention illustrating its use to produce mechanical power.

The thermally powered multi-purpose heat transfer system or engine 10-2 depicted in FIG. 2 can be operated as an air conditioning system for cooling during the summer and as a heat pump system for heating during the winter. For the purpose of illustrating the manner in which sequential displacement as described and claimed in U.S. Pat. No. 4,537,037 could be employed, the heat source is assumed to be heat from a prior heat transfer system and evaporator 16-2 is modified accordingly. Condenser 32-2 has also been modified for reasons that will become evident later and one way valves 100, 104, 108 and 114 have been changed to solenoid valves 172, 173, 174, 175 mounted on powered cylinders 42-2 44-2 for reasons that will become evident later. Other components of the power side 12-2 have been incorporated in engine 10-2 depicted in FIG. 2 as they were incorporated in engine 10 as depicted in FIG. 1. The powered side 14-2 of engine 10-2 has been changed to reflect the change in the purposes of the system.

Engine 10-2 consists of a powered side 14-2 and a power side 12-2, each of which is a closed loop system containing a refrigerant. Power side 12-2 includes evaporator 16-2 containing refrigerant 18-2 which receives heat from condenser 196 from some other heat transfer system, power chambers 164-2, 166-2 of power cylinders 22-2, 24-4, condenser 32-2 which is depicted as an air cooled heat transfer unit with a fan driving the air, pump 40-2, solenoid valves 26-2, 28-2, 34-2, 36-2 and connecting pipes 20-2, 30-2, 38-2, all of which form a closed heat transfer loop. The powered side 14-2 consists of two air cooled heat transfer units 180 and 182 which are depicted with fans for driving the air, two liquid level control switches 184 and 185, solenoid valves 172, 173, 174, 175 and 186, pipes 188, 189, and 190, and capillary tube 192, all of which in conjunction with upper portions 62-2, 63-2 form a closed heat transfer loop which is filled with refrigerant 192 in both liquid and vapor states. Upper spaces 60-2, 61-2 of power cylinders 22-2, 24-2 and lower spaces 66-2, 67-2 of powered cylinders 42-2, 44-2 are each filled with a suitable fluid, which fluids serve as fluid pistons acting on pistons 50-2, 56-2, and pistons 54-2, and 59-2. The space between piston 50-2 and diaphragm 68-2 and between piston 56-2 and diaphragm 70-2 are also filled with a liquid such as that filling spaces 60-2, 61-2.

Heat transfer unit 182 is located within structure 194 and heat transfer unit 180 is located outside structure 194 in the ambient environment. When engine 10-2 is used for cooling, liquid level control switch 184 is deactivated and liquid level control switch 185 is activated; when used for heating, liquid level control switch 184 is activated and liquid level control switch 185 is deactivated. When heat transfer system 10-2 is used for cooling the interior of structure 194, switch 88-2 causes solenoid valves 26-2, 36-2, 173 and 174 to open and also causes solenoid valves 28-2, 34-2, 172 and 175 to close. When heat transfer system 10-2 is used for heating, switch, 88-2, causes solenoid valves 26-2, 36-2, 172 and 175 to open and also causes solenoid valves 28-2, 34-2, 173 and 174 to close. When heat transfer system 10-2 is used for heating, switch 90-2 causes solenoid valves 26-2, 36-2, 172 and 175 to close and also causes solenoid valves 28-2, 34-2, 173, 174 to open. When heat transfer system 10-2 is used for cooling, switch 90-2 causes solenoid valves 26-2, 36-2, 173 and 174 to close and also causes solenoid valves 28-2, 34-2, 172 and 175 to open. When heat transfer system 10-2 is used for cooling, the heated air that is driven through condenser 32-2 is exhausted to the atmosphere. When heat transfer system 10-2 is used for heating, the heated air is circulated within structure 194.

Let us assume that the refrigerant 18-2 contained within closed loop 12-2 of thermally powered heat transfer system 10-2 is refrigerant R11, trichlorofluoromethane, that the evaporation temperature within the evaporator 16-2 is 160° F., at which temperature refrigerant R11 has a vapor pressure of 60.45 PSIA, that the condensing temperature within condenser 32-2 is 100° F., at which temperature refrigerant R11 has a vapor pressure of 23.45 PSIA, and that heat transfer system 10-2 in this example is used for cooling. Let us also assume that the refrigerant contained within closed loop 14-2 of thermally powered heat transfer system 10-2 is refrigerant R12, dichlorodifluoromethane, that the evaporation temperature within the evaporator 182 is 50° F., at which temperature refrigerant R12 has a vapor pressure of 61.39 PSIA, and that the condensing temperature within condenser 180 is 100° F., at which temperature refrigerant R12 has a vapor pressure of 131.86 PSIA. Let us also assume an area of 144 square inches for rigid piston 50-2 and for rigid piston 56-2 and an area of 72 square inches for rigid piston 54-2 and 59-2. And let us again ignore frictional and other losses.

When switch 88-2 is activated by the deflation of the flexible diaphragm 68-2 of power cylinder 22-2, switch 88-2 causes solenoid valves 26-2, 36-2, 173 and 174 to open and also causes solenoid valves 28-2, 34-2, 172 and 175 to close. The open valves permit refrigerant R11 vapor at a pressure of 60.45 PSIA to flow into chamber 164-2 of cylinder 22-2 causing flexible diaphragm 68-2 to inflate which causes rigid piston 50-2 to move upward and causes rigid piston 56-2 to move downward, deflating flexible diaphragm 70-2 and causing refrigerant R11 vapor to flow from power chamber 166-2 of cylinder 24-2 into condenser 32-2 where it condenses at a pressure of 23.45 PSIA. The net force exerted by this difference in pressure is equal to 37 (60.45−23.45) times the assumed area of 144 square inches or 5328 pounds. When valves 173 and 174 are opened as described above and valves 172 and 175 are closed, upper portion 62-2 of powered cylinder 42-2 is filled with R-12 vapor at a pressure of 61.39 PSIA and R12 vapor through valve 174 enters upper portion 63-2 of cylinder 44-2 at a pressure of 61.39 PSIA from evaporator 182 through vapor pipe 190. (Backflow of R12 vapor at a pressure of 131.86 PSIA from vapor pipe 188 into upper portion 62-2 will occur but this backflow is for the moment ignored.) R12 vapor at a pressure of 61.39 PSIA exerts a force upon the upper surfaces of rigid pistons 54-2 and 59-2 equal to 4420 pounds (61.39×72), but since these forces are equal and opposing, the net force exerted upon the bottom surface of rigid piston 50-2 will cause pistons 50-2 and 54-2 to move upward and pistons 56-2 and 59-2 to move downward so long as the force exerted upon the upper surface of rigid piston 54-2 does not exceed 4420 pounds by more than 5328 pounds. Since the area of rigid piston 54-2 is 72 square inches, these piston movements will occur so long as the refrigerant R12 vapor pressure in upper portion 62-2 does not increase by more than a maximum of 74 pounds (5328/72) or does not equal or exceed a pressure of 135.39 PSIA (61.39+74). Since the condensing vapor pressure of R12 in condenser 180 is 131.86 PSIA, these piston movements will continue until all R12 vapor has been forced out of upper chamber 62-2 through vapor pipe 188 into condenser 180 where it will condense and flow through liquid pipe 189 and solenoid valve 186 and capillary tube 192 into evaporator 182 where it will vaporize and flow through vapor pipe 190 into upper chamber 63-2 through open solenoid valve 174. Liquid level control switch 185 monitors the liquid level of R12 within evaporator 182 and when that level reaches a given maximum switch 185 closes solenoid valve 186. When the liquid level falls to a given minimum, switch 185 opens valve 186.

When piston movements are complete diaphragm 70-2 of power chamber 166-2 of cylinder 24-2 is completely deflated and causes switch 90-2 to open solenoid valves 28-2, 34-2, 172 and 175 and to close solenoid valves 26-2, 36-2, 173, 174. This permits R11 vapor to flow from evaporator 16-2 via vapor pipe 20-2 into power chamber 166-2 of cylinder 24-2 and permits R11 vapor to flow from power chamber 164-2 of cylinder 22-2 via vapor pipe 30-2 into condenser 32-2. This also permits R12 vapor to flow from evaporator 182 via vapor pipe 190 into upper chamber 62-2 of cylinder 42-2 and permits R12 vapor to flow from upper chamber 63-2 of cylinder 44-2 via vapor pipe 188 into condenser 184. As flexible diaphragm 70-2 inflates it causes the upward movement of pistons 56-2 and 59-2, the downward movement of pistons 50-2 and 54-2, and the deflation of flexible diaphragm 68-2. The removal of heat from structure 194 by evaporator 182 causes the cooling of structure 194. When flexible diaphragm 68-2 is completely deflated, it activates switch 88-2 and this ends one cycle of operation and starts the next.

When heat transfer system 10-2 is used for cooling, outdoor air is circulated through condenser 32-2 of closed loop 12-2 and the air along with heat is rejected to the atmosphere. Condensed R11 flows from condenser 32-2 through liquid refrigerant pipe 38-2 to pump 40-2 which pumps the liquid into evaporator 16-2.

When engine 10-2 is used for heating, liquid level control switch 184 is activated, liquid level control switch 185 is deactivated. A separate circuit is used to control the opening and closing of valves as detailed below. The function of heat exchanger 180 is changed. Heat exchanger 180 becomes the evaporator for closed loop 14-2. The function of heat exchanger 182 is also changed, with it becoming the condenser for closed loop 14-2. Air from 194 is circulated through condenser 32-2 of closed loop 12-2 and this air along with heat is returned to structure 194. For the purpose of illustrating the use of this invention for heating a home, let us assume an evaporating temperature within evaporator 16-2 of 160° F., at which temperature R11 has a vapor pressure of 60.45 PSIA, a condensing temperature within condenser 32-2 of 90° F., at which temperature R11 has a vapor pressure of 19.59 PSIA, an evaporating temperature of 20° F. within evaporator 180, at which temperature R12 has a vapor pressure of 35.74 PSIA, and a condensing temperature of 90° F. within condenser 182, at which temperature R12 has a vapor pressure of 114.49 PSIA. Hence the difference in vapor pressure between evaporator and condenser is 40.86 PSI for refrigerant R11 and 78.75 PSI for refrigerant R12.

When switch 88-2 is activated by the deflation of flexible diaphragm 68-2, switch 88-2 causes solenoid valves 26-2, 36-2, 172 and 175 to open and solenoid valves 28-2, 34-2, 173 and 174 to close. This permits R11 vapor at a pressure of 60.45 PSIA to flow from evaporator 16-2 via vapor pipe 20-2 into power chamber 164-2 of cylinder 22-2 causing flexible diaphragm 68-2 to inflate and permits R11 vapor to flow from power chamber 166-2 via vapor pipe 30-2 into condenser 32-2 where it condenses at a pressure of 19.59 PSIA. This causes rigid pistons 50-2 and 54-2 to move upward and causes rigid pistons 56-2 and 59-2 to move downward deflating flexible diaphragm 70-2. The net force exerted by the upper surface of piston 54-2 upon the R12 vapor in upper chamber 62-2 is 5883 pounds ([60.45−19.59]×144). Thus the pressure of R12 vapor in upper chamber 62-2 can be increased by up to 81.7 PSI (5883÷72). Since the initial pressure of R12 vapor in upper chamber 62-2 is 35.74 PSIA, the pressure of the R12 vapor in upper chamber 62-2 could be increased up to a maximum of 117.44 PSIA (35.74+81.7). But at a lesser pressure the R12 vapor will flow from upper chamber 62-2 via vapor pipe 190 into condenser 182 where it will condense at a pressure of 114.49 PSIA, the heat being transferred to the interior of structure 194 by air circulated through condenser 182. The liquid R12 flows through capillary tube 192 and through solenoid valve 186 and pipe 189 into evaporator 180 where heat is acquired from outdoor ambient air to vaporize the R12 which then flows via vapor pipe 188 through solenoid valve 175 into upper chamber 63-2 of compressor cylinder 44-2. Thus the heat transferred to structure 194 by condenser 32-2 is supplemented by heat from outdoor air.

When these piston movements are complete and flexible diaphragm 70-2 is completely deflated, flexible diaphragm 70-2 activates switch 90-2 which causes solenoid valves 28-2, 34-2, 173 and 174 to open and causes solenoid valves 26-2, 36-2, 172, 175 to close. This permits R11 vapor to flow from evaporator 16-2 via vapor pipe 20-2 into power chamber 166-2 of power cylinder 24-2 and permits R11 vapor to flow from power chamber 164-2 via vapor pipe 30-2 into condenser 32-2. This causes flexible diaphragm 70-2 to inflate causing pistons 56-2 and 59-2 to move upward and causes rigid pistons 50-2 and 54-2 to move downward. R12 vapor at a pressure of 35.74 PSIA flows from evaporator 180 via vapor pipe 188 into upper chamber 62-2 and causes R12 vapor at a pressure of 114.49 PSIA to flow from upper chamber 63-2 via vapor pipe 190 into condenser 182. When these movements are complete and diaphragm 68-2 is completely deflated, diaphragm 68-2 activates switch 88-2. This cycle of operation is complete and the next cycle begins.

Thus, as illustrated, this invention as depicted in FIG. 2 can be employed as an air conditioning system to cool a home in the summer and can be employed as a heat pump to heat a home in the winter.

This invention, as depicted in FIG. 1 and in FIG. 2, can utilize sequential displacement as described and disclosed in U.S. Pat. No. 4,537,037. In FIG. 1 the condenser 32 of this invention is also depicted as a source of heat for the evaporator of a following heat transfer system. In FIG. 2, the evaporator of this invention is also depicted as the condenser 196 of a preceeding heat transfer loop.

Figure 3:
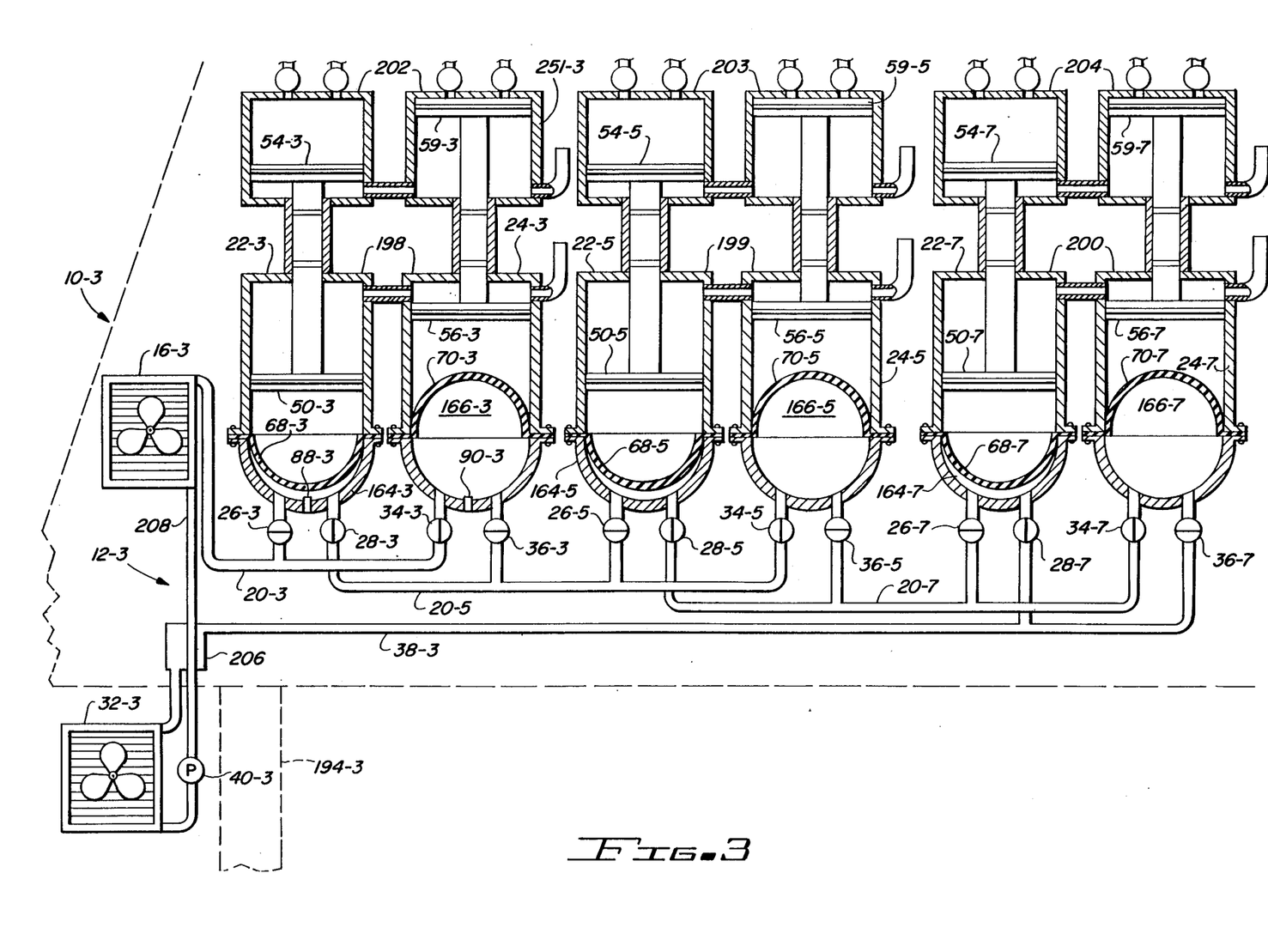
FIG. 3 is a schematic view of yet another embodiment of this invention illustrating isothermal or adiabatic displacement which is employed to improve thermal efficiency.

FIG. 3 depicts a significant improvement which permits sequential displacement to be employed without the necessity of having heat transfer loops between pairs of power cylinders. As depicted in FIG. 3 isothermal expansion to takes place between pairs of power cylinders but the system may be designed to employ adiabatic expansion between pairs of power cylinders without departing from the spirit and scope of the novel concepts of this invention. The use of sequential displacement results in higher thermal efficiency and is made possible by the capabilities of the new and unique pairs of power cylinders of this invention. Multi-purpose heat transfer engine 10-3 depicted in FIG. 3 employs three pairs of power cylinders 198, 199, 200. One or more pairs of powered cylinders, or compressors, could be employed as depicted in FIG. 1, one dual compressor could be employed as depicted in FIG. 2, and one or more pairs of powered cylinders could be omitted with the pair of power cylinders being employed to produce mechanical power as depicted in FIG. 4. One dual compressor could also be employed to store heat or cold for later use or for some other purpose such as the pumping of water. For simplicity, and because the specific work performed by the engine is not material to this disclosure, only pairs of powered cylinders 202, 203, 204 are illustrated in FIG. 3.

Thus, thermally powered engine 10-3 as illustrated in FIG. 3 consists of power side 12-3 which is a closed heat transfer loop consisting of evaporator 16-3, vapor pipe 20-3, power chambers 164-3, 166-3 of power cylinder pair 198, vapor pipe 20-5, power chambers 164-5, 166-5 of power cylinder pair 199, vapor pipe 20-7, power chambers 164-7, 166-7 of power cylinder pair 200, vapor pipe 38-3, condenser 32-3, liquid pipe 208, heat recovery unit 206, and pump 40-3. Solenoid valves 26-3 and 34-3 control the flow of vapor from evaporator 16-3 to power cylinders 22-3, 24-3 respectively. Solenoid valves 28-3 and 36-3 control the flow of vapor from cylinders 22-3, 24-3. Solenoid valves 26-5 and 34-5 control the flow of working fluid vapor into power cylinders 22-5 and 24-5. Solenoid valves 28-5 and 36-5 control the flow of vapor from cylinders 22-5 and 24-5. Solenoid valves 26-7 and 34-7 control that flow into cylinders 22-7 and 24-7 and solenoid valves 28-7 and 36-7 control the flow of vapor from cylinders 22-7, 24-7 to condenser 32-3. Switch 88-3 within power chamber 164-3 of cylinders 22-3 and switch 90-3 within power chamber 166-3 of cylinder 24-3 control the opening and closing of all the power side solenoid valves. Pump 40-3 pumps liquid refrigerant from condenser 32-3 via pipe 208 through heat recovery unit 206 to add heat to the liquid refrigerant flowing to evaporator 16-3. Notice that the power side 12-3 of engine 10-3 includes only a single evaporator 16-3 and a single condenser 32-3. Engine 10-3, except for condenser 32-3 and pump 40-3 is depicted in FIG. 3 as being located in the attic of structure 194-3. Each power cylinder pair 198, 199, 200 utilizes a fluid filling the upper spaces of each power cylinder pair which fluid forms a liquid piston capable of acting on the upper surface of each rigid power piston. The space between the bottom surface of each power piston and the flexible diaphragm is preferably filled with the same fluid.

To illustrate the operation of this invention as depicted in FIG. 3 and of the unique features of this invention, let us assume the temperature within the attic of structure 194-3 is slightly above 180.56° F., that the power side closed heat transfer loop 12-3 is filled with liquid and vapor R11 refrigerant, and that switch 88-3 of cylinder 22-3 has just been activated by the deflation of diaphragm 68-3 and has just changed the solenoid valve positions to the reverse of those shown in FIG. 3. Let us also assume that one pound of refrigerant 11 vapor completely inflates each diaphragm of each compressor under the specific conditions to be cited. Specifically, diaphragms 68-3 and 70-3 of cylinders 22-3 and 24-3 respectively when fully inflated are designed to hold one pound of R11 vapor at a temperature of 180.56° F. and a pressure of 80 PSIA, giving them a volume of 0.54963 cubic foot. Diaphragms 68-5 and 70-5 of cylinders 22-5 and 24-5 respectively when fully inflated are designed to hold one pound of R11 vapor at a temperature of 180° F. and a pressure of 60 PSIA, giving them a volume of 0.75945 cubic feet. Diaphragms 68-7 and 70-7 of cylinders 22-7 and 24-7 respectively when fully inflated are designed to hold one pound of R11 vapor at a temperature of 180° F. and a pressure of 40 PSIA, giving them a volume of 1.1779 cubic feet.

Air circulated through evaporator 16-3 causes liquid refrigerant R11 to vaporize at a temperature of 180.56° F. and a pressure of 80 PSIA. The R11 vapor flows through pipe 20-3 through open valve 26-3 into power chamber 164-3 and causes diaphragm 68-3 to inflate which causes pistons 50-3 and 54-3 to move upward and pistons 56-3 and 59-3 to move downward and which in turn causes diaphragm 70-3 to deflate. As diaphragm 70-3 deflates, R11 vapor is forced from power chamber 166-3 through open valve 36-3 and pipe 20-5 and open valve 26-5 into power chamber 164-5 of cylinder 22-5. This causes diaphragm 68-5 to inflate which causes pistons 50-5 and 54-5 to move upward and pistons 56-5 and 59-5 to move downward which in turn causes diaphragm 70-5 to deflate. As diaphragm 70-5 deflates R11 is forced from power chamber 166-5 of cylinder 24-5 through open valve 36-5 and pipe 20-7 and open valve 26-7 into power chamber 164-7 of cylinder 22-7. This causes diaphragm 68-7 to inflate which causes pistons 50-7 and 54-7 to move upward and pistons 56-7 and 59-7 to move downward which in turn causes diaphragm 70-7 to deflate. As diaphragm 70-7 deflates R11 vapor is forced from power chamber 166-7 of cylinder 24-7 through open valve 36-7, pipe 38-3 and heat recovery unit 206 into condenser 32-3. When these movements are completed, deflated diaphragm 70-3 activates switch 90-3 which causes all open valves to close and all closed valves to open. R11 vapor then flows from evaporator 16-3 through pipe 20-3 and open valve 34-3 into power chamber 166-3 of cylinder 24-3 and causes diaphragm 70-3 to inflate which causes pistons 56-3 and 59-3 to move upward and pistons 50-3 and 54-3 to move downward and which in turn causes diaphragm 68-3 to deflate. As diaphragm 68-3 deflates R11 vapor is forced from power chamber 164-3 of cylinder 22-3 through open valve 28-3 pipe 20-5 and open valve 34-5 into power chamber 166-5 of cylinder 24-5. This causes diaphragm 70-5 to inflate which causes pistons 56-5 and 59-5 to move upward and pistons 50-5 and 54-5 to move downward and which in turn causes diaphragm 68-5 to deflate. As diaphragm 68-5 deflates R11 vapor is forced from power chamber 164-5 pipe 20-7 and open valve 34-7 into power chamber 166-7 of cylinder 24-7. This causes diaphragm 70-7 to inflate which causes pistons 56-7 and 59-7 to move upward and pistons 50-7 and 54-7 to move downward and which in turn causes diaphragm 68-7 to deflate. As diaphragm 68-7 deflates R11 vapor is forced from power chamber 164-7 of cylinder 22-7 through open valve 28-7, pipe 38-3 and heat recovery unit 206 into condenser 32-3. Condensed liquid R11 is pumped by pump 40-3 from condenser 32-3 through pipe 208 and heat recovery unit 206, in which unit heat is transferred from the R11 vapor to the R11 liquid, into evaporator 16-3. When these movements are complete deflated diaphragm 68-3 of cylinder 22-3 activates switch 88-3 which causes all open valves to close and all closed valves to open, and one cycle of operation of engine 10-3 is complete.

As the R11 vapor moves from one compressor to another, the temperature is maintained at an assumed 180° F. by the ambient temperature of the attic although other means of maintaining the evaporating temperature could be employed without departing from the spirit of this invention. Expansion is therefore isothermal. Given constant temperature, a specific quantity of vapor (one pound), and a given volumetric relationship between the power chambers of the power cylinders, the pressure change in the R11 vapor is determined. Thus, if R11 vapor fills power chambers 164-3 and 166-3 of power cylinders 22-3, 22-4 alternately at a temperature of 180.56° F. and a pressure of 80 PSIA, power chambers 164-5 and 166-5 of cylinders 22-5 and 24-5 will be filled alternately at a pressure of 60 PSIA if the temperature is 180° F., and power chambers 164-7 and 166-7 of cylinders 22-7 and 24-7 will be filled alternately at a pressure of 40 PSIA if the temperature is 180° F. Thus, one of the advantages of this invention is that it permits vapor temperature to be maintained as the vapor moves from one pair of power cylinders to another pair, thus permitting isothermal expansion to take place between the pairs of power cylinders.

Let us now assume that the length of all rigid piston strokes is 12 inches. Thus the area of piston 50-3 and of 56-3 is 79.147 square inches (144×0.54963), the area of rigid pistons 50-5, and of piston 56-5 is 109.36 square inches (144×0.75945), and the area of rigid piston 50-7 and of rigid piston 56-7 is 169.618 square inches (144×1.1779). Since by design the pressure difference which powers each dual compressor is the same (20 PSI), given a condensing temperature of 91.14° F. and a condensing pressure of 20 PSIA, the work performed by each dual compressor system is proportionate to the area. That is, each power stroke of the pistons 50-3 and 56-3 of the pair 198 of power cylinders 22-3, 24-3 is capable of performing slightly less than 1582.94 foot pounds of work, ignoring frictional and other losses. Each power stroke of the pistons 50-5 and 56-5 of the pair 199 of power cylinders 22-5, 24-5 is capable of performimg slightly less than 2187.22 foot pounds of work, and each power stroke of the pistons 50-7 and 56-7 of the pair 200 of power cylinders 22-7 and 24-7 is capable of performing slightly less than 3392.35 foot pounds of work. Each cycle, involving the evaporation of two pounds of R11 vapor and 6 piston strokes, that accomplish work, is thus capable of performing slightly less than 14,325 foot pounds of work.

Each pair of powered cylinders could be utilized to perform useful work of a different type as indicated previously or all pairs of power cylinders could also be utilized to produce the same type of work.

If an engine having a single pair of power cylinders as illustrated in FIG. 2 were constructed having the physical dimensions given for pair 198 illustrated in FIG. 3, if the condensing temperature of R11 has a vapor pressure of 20 PSIA and a liquid enthalpy of 26.845 BTU/lb., if the evaporating temperature of R11 is 180.56° F., at which temperature R11 has a vapor pressure of 80 PSIA and a vapor enthalpy of 112.968 BTU/lb., and if the potential for heat recovery by heat recovery unit 206 is ignored, the evaporation of two pounds of R11 per cycle requires a heat input of 172.246 BTUs. Since the pressure difference under these conditions is 60 PSI, this single pair of power cylinders can perform slightly less than 4748.82 foot pounds of work per stroke or three times the work that can be performed by power cylinders 22-3, 24-3. The total work performed per cycle by such a pair of power cylinders is thus slightly less than 9497.64 foot pounds for a heat input of 172.246 BTUs, or 55.14 foot pounds of work per BTU.

Initial heat input for cylinders 22-3, 24-3 of engine 10-3 illustrated in FIG. 3 would be the same, 172.246 BTUs per cycle. Between cylinders 22-3 and 24-3 and 22-5 and 24-5 an additional 0.982 BTU/lb. would be required to maintain a vapor temperature of 180° F. and between cylinders 22-5 and 24-5 and 22-7 and 24-7 an additional 1.002 BTUs/lb would be required to maintaine a vapor temperature of 180° F. Thus total heat input per cycle would increase to 176.214 BTUs/lb. But the multiple pairs of power cylinders of engine 10-3 are capable of performing slightly less than 14,325 foot pounds of work. Thus, engine 10-3 can perform slightly less than 81.29 foot pounds of work per BTU. The thermal efficiency of engine 10-3 increases from 7.086% to 10.446%, an increase in efficiency of 47.42%. Thus, where thermal efficiency is an important consideration, isothermal sequential displacement can be employed to perform a single function or multiple functions. It should be pointed out that where isothermal sequential displacement is employed to perform a single function, it is not necessary that the pressure drops between dual compressors be equal since the area relationships between upper and lower rigid pistons can be varied by design, just as the pressure drop between dual compressors at a constant vapor temperature can be varied by design.

In FIG. 4, thermally powered engine 10-4 which has been modified to produce mechanical power includes a pair of power cylinders 22-4, 24-4. The elements of cylinders 22-4, 24-4 are the same as those of power, cylinders 22, 24 illustrated in FIG. 1 and described supra. Details of the power side closed heat transfer loop 12-4 for cylinders 22-4 and 24-4 are not illustrated since they are the same as described and illustrated with respect to heat transfer loop 12 of engine 10 illustrated in FIG. 1. The reciprocating motion of piston 50-4 and 56-4 as the vaporized working fluid from the evaporator flows into and out of power chambers 164-4 and 166-4 of cylinders 22-4 and 24-4 under the control of valves 26-4, 28-4, 34-4 and 36-4, rotate crank shaft 212 which is pivotally connected to piston rods 52-4, 58-4 by connecting rods 214, 216. Gear 218 mounted on shaft 212 meshes with gear 220 mounted on power shaft 222 to rotate power shaft 222.

In operation, the motion of pistons 50-4, 56-4 is such that they are substantially 180° out of phase, or when piston 50-4 is moving upward executing a power stroke, piston 56-4 is moving downward executing an exhaust stroke and vice versa. The presence of the same fluid on both sides of pistons 50-4, 56-4 filling upper spaces 60-4, 61-4, and filling the spaces between piston 50-4 and diaphragm 68-4 and piston 56-4 and diaphragm 70-4 has the benefit of minimizing leakage of the fluid around the pistons 50-4 and 56-4 while minimizing the frictional losses associated with the movememt of pistons 50-4, 56-4. Flexible diaphragms 68-4, 70-4 isolate the working fluid, refrigerants, used in the power side heat transfer loop 12-4 from any contaminants that may be found in or introduced into the lower portions 64-4, 65-4 of the interior space of cylinders 22-4 and 24-4.

What I claim is:

1. An engine comprising:
    a pair of power cylinders, each power cylinder defining a closed interior space, each cylinder having an upper and a lower end;
    a piston reciprocally mounted within the interior space of each cylinder, the cylinder dividing the interior space of each cylinder into an upper portion and a lower portion;
    a piston rod connected to each piston and projecting through the upper and of each cylinder;
    a fluid substantially filling the upper portions of the two cylinders;
    means for permitting the fluid to flow between upper portions of the two cylinders;
    a heat transfer loop including a working fluid, an evaporator, a condenser, and the lower portions of each of the two power cylinders;
    control means for controlling the flow of the working fluid through the heat transfer loop and through the lower portion of each of the cylinders so that movement of the pistons is substantially 180° out of phase; and
    means for converting the motion of the two piston rods into useful work.

2. An engine as defined in claim 1 in which the means for converting the motion of the two piston rods into useful work pressurize a fluid.

3. An engine as defined in claim 2 in which the fluid pressurized is air.

4. An engine as defined in claim 2 in which the fluid pressurized is a refrigerant of a second closed heat transfer loop.

5. An engine as defined in claim 1 in which the means for converting the motion of the two piston rods into useful work converts the motion of the piston rods into the rotation of a power shaft.

6. An engine comprising:
a pair of power cylinders, each cylinder defining a closed interior space, each cylinder having a pair of ends;
a piston reciprocally mounted within the closed interior space of each power cylinder and dividing the space into an upper portion and a lower portion;
a piston rod connected to each piston and projecting through the upper end of each cylinder;
a flexible diaphragm mounted in the lower portion of the interior space of each cylinder, the space enclosed by the flexible diaphragm and the lower end of the cylinder defining a power chamber the size of which varies from a maximum to a minimum;
connecting means for connecting the upper portions of the interior space of the two power cylinders and through which connecting means a liquid can flow between said to upper portions;
a liquid substantially filling the upper portions of the two cylinders and the connecting means;
a heat transfer loop including a refrigerant, an evaporator, a condenser, the power chambers of the two power cylinders, and valve means for regulating the flow of refrigerant into and out of the power chambers of each cylinder;
control means for controlling the valve means so that movement of the pistons within the power cylinders is out of phase; and
means for converting the motion of the two piston rods into mechanical energy.

7. An engine as defined in claim 6 in which the means for converting the motion of the two piston rods into mechanical energy is used to pressurize a fluid.

8. An engine as defined in claim 6 in which the means for converting the motion of the two piston rods into mechanical energy converts the motion of the piston rods into rotation of a shaft.

9. An engine comprising:
a pair of power cylinders and a pair of powered cylinders; each cylinder defining a closed interior space, each cylinder having an upper and a lower end;
a piston reciprocally mounted within the interior space of each cylinder, the piston dividing the interior space of each cylinder into an upper portion and a lower portion;
a piston rod connecting the pistons of a power cylinder with the piston of a powered cylinder with which each power cylinder is associated;
a first fluid substantially filling the upper portion of the two power cylinders;
first communication means for permitting the first liquid to flow between the upper portions of the two power cylinders;
a flexible diaphragm mounted in the lower portion of each of the power cylinders, the space between each flexible diaphragm and the lower end of the power cylinders within which the diaphragm is mounted defining a power chamber; the space of the lower portion of each power cylinder between the piston and the flexible diaphragm being filled with a given volume of the first fluid;
a heat transfer loop including a working fluid, an evaporator, a condenser, the power chamber of the two power cylinders and valve means for regulating the flow of working fluid through the power chambers of each of the power cylinders;
control means for controlling the valve means so that movement of the two pairs of pistons is substantially 180° out of phase;
means for admitting a second fluid to be pressurized into the upper portions of each of the powered cylinders and for permitting the pressurized fluid to flow out of said powered cylinder.
said second fluid substantially filling the lower portion of the powered cylinders; and
a second communication means for permitting the second fluid to flow between the two lower portions of the two powered cylinders.

10. An engine as defined in claim 9 in which the second fluid is ambient air.

11. An engine as defined in claim 9 in which the second fluid is a refrigerant of a second closed heat transfer loop.

12. An engine as defined in claim 9 in which the first fluid is water.

13. An engine as defined in claim 9 in which the first fluid is a lubricant.

14. An engine comprising:
a plurality of pairs of power cylinders, each power cylinder defining a closed interior space, and each cylinder having a first and a second end;
a piston reciprocally mounted within the interior space of each power cylinder of each pair of power cylinder and dividing the enclosed space within each power cylinder into two portions, a first portion and a second portion;
a piston rod connected to the piston of each power cylinder and projecting through the first end of each power cylinder;
a flexible diaphragm mounted in the second portion of each power cylinder the space enclosed between the flexible diaphragm and the second end of each power cylinder defining a power chamber having a maximum and a minimum volume;
a fluid substantially filling the first portions of each pair of power cylinders;
means interconnecting the first portions of each pair of power cylinder so that said fluid can flow between the two first portions of each of said power cylinders;
a given volume of said fluid being positioned in the second portion of each power cylinder between the piston and the flexible diaphragm;
a heat transfer loop including a working fluid, an evaporator, a heat sink, and the power chambers of each of the pairs of power cylinders, and valve means for regulating the flow of working fluid through the power chambers of each of the pairs pairs of power cylinders;
control means for controlling the valve means so that the motion of the pistons of each pair of powered cylinder is substantially 180° out of phase with the other piston of the pair;
means for causing the working fliud flowing out of the power chambers of a first pair of power cylinders to flow into the power chambers of a next succeeding pair of power cylinders, said working fluid flowing through the pairs of power cylinders serially with the working fluid from the last pair of power cylinders flowing into the condenser of the heat transfer loop; and
means for converting motion of the piston rods of the pairs of power cylinders to useful work.

15. An engine as defined in claim 14 in which the volume of the power chamber of each pair of power cylinders is such that at the temperature and pressure of the working fluid when the power chambers are expanded to their maximum extent, the weight of the working fluid contained in each fully expanded power chamber is substantially equal.

16. An engine as defined in claim 15 in which the temperature of the working fluid in the power chambers of each pair of power cylinders is substantially equal.

17. An engine as defined in claim 16 in which the means for converting motion of the piston rods includes means for producing rotation of a shaft.

18. An engine as defined in claim 14 in which the expansion of the working fluid in the power chambers of the power cylinders is adiabatic.

19. An engine as defined in claim 14 in which the expansion of the working fluid in the power chambers of the power cylinders is isothermal.

20. The method of separating the total force exerted by a working fluid of a closed heat transfer loop against pistons of a pair of power cylinders of an engine during the pistons power strokes from the force required by the pistons during their exhaust strokes to produce a net force available for performing useful work; each power cylinder of the engine defining a closed interior space each of said cylinders having an upper end and a lower end, the pistons being reciprocally mounted in each cylinder and dividing the interior space of each cylinder into an upper and a lower portion, each piston having a piston rod which extends through the upper end of the cylinder in which the piston is mounted the heat transfer loop including a working fluid, an evaporator, a condensor, and a portion of the two power cylinders; the net force available for useful work being exerted by the piston rod of each piston during its power stroke, comprising the steps of:

provrding a communication path between the upper portions of the interior spaces of the two power cylinders; and filling said upper portion and the communication path with a fluid.

* * * * *